(No Model.)

G. B. BEST.
CHILD'S CARRIAGE.

No. 492,656.  Patented Feb. 28, 1893.

WITNESSES:
Paul Jobst
C. Sedgwick

INVENTOR
G. B. Best
BY
Munn & Co
ATTORNEYS.

UNITED STATES PATENT OFFICE.

GEORGE B. BEST, OF ENGLEWOOD, NEW JERSEY.

CHILD'S CARRIAGE.

SPECIFICATION forming part of Letters Patent No. 492,656, dated February 28, 1893.

Application filed May 13, 1892. Serial No. 432,861. (No model.)

*To all whom it may concern:*

Be it known that I, GEORGE B. BEST, of Englewood, in the county of Bergen and State of New Jersey, have invented a new and Improved Steering Device for Children's Carriages, of which the following is a full, clear, and exact description.

My invention relates to an improvement in steering devices for children's carriages, and has for its object to provide a device exceedingly simple, and capable of convenient and expeditious manipulation in such a manner as to direct the forward wheels of the carriage to the right or the left, and whereby when the device is released it will automatically return the wheels to a position enabling the carriage to be directed straight ahead.

Another object of the invention is to provide a device capable of accomplishing the above named results and which may be readily attached to the running gear of any child's carriage.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
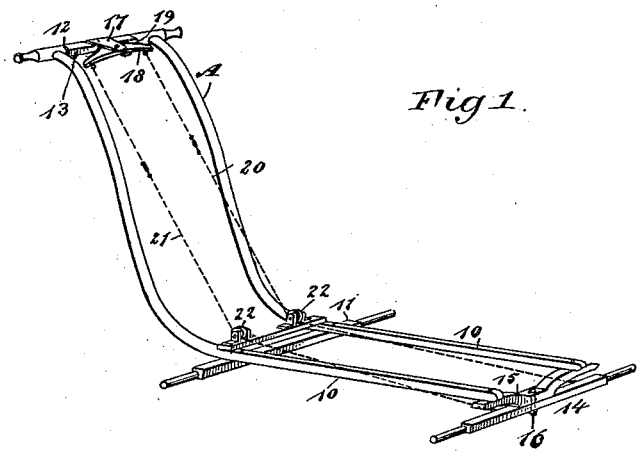
Figure 3:
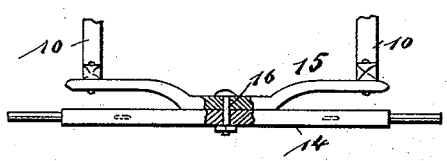
Figure 2:
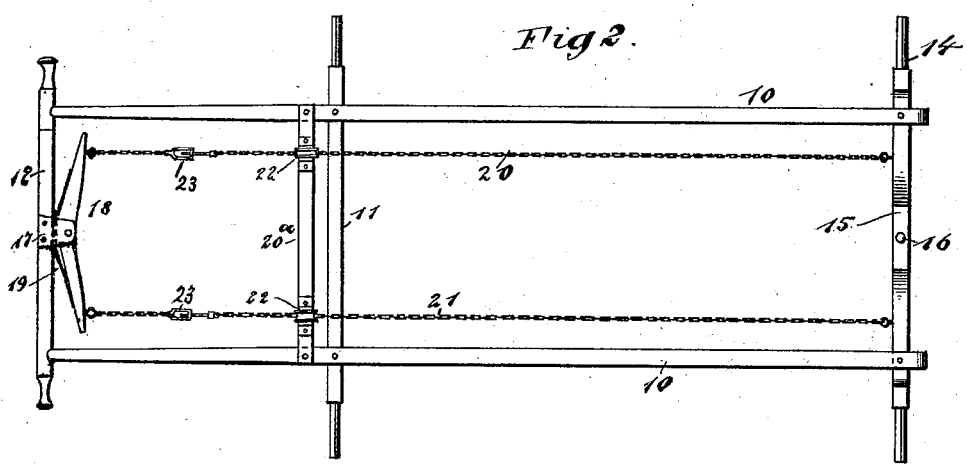

Figure 1 is a perspective view of a portion of the running gear of a child's carriage, illustrating the application thereto of the steering device. Fig. 2 is a plan view of the running gear, shown in Fig. 1; and Fig. 3 is a front elevation of the front axle and the bolster of the gear.

The side bars 10 of the running gear are attached to the rear axle 11 in any suitable or approved manner, the rear ends of the side bars being carried upward and rearward beyond the rear axle to form the usual handle A of the running gear, the handle sections of the side bars being connected at their upper ends by a cross bar 12, which cross bar is preferably provided with a square or flat surface 13 upon its inner face. The forward ends of the side bars, which are usually attached to the forward axle 14, are secured to the ends of a bolster 15, and to this bolster the forward axle 14 is pivotally connected by a pivot bolt 16, or the equivalent thereof, as shown in detail in Fig. 3.

At the center of the handle bar 12 a forwardly-extending bracket or clip 17, is secured, and to this bracket or clip is pivoted at its center a lever 18. The rear face of the lever is beveled from the center outward in direction of its ends, the bevel being decided, and the said beveled face is more or less flat. Thus the lever 18 may be said to be an angular lever, and a spring 19, preferably of the bow pattern, is made to bear at its ends against the beveled surfaces of the lever, the central portion of the spring being held in engagement with the handle bar 12 in any suitable or approved manner, the central portion of the spring being contained within the bracket or clip 17 and immediately back of the central portion of the lever.

Two cables or chains 20 and 21, are employed, one cable or chain being secured to each end of the lever 18. These cables or chains are carried forward over friction pulleys 22 on a cross bar 20ª, attached to the side bars 10, and the forward ends of the cables or chains are secured to the forward axle 14, one at each side of its pivot point. The friction rollers 22, are usually secured upon the cross bar 20ª, attached to the side bars of the running gear at such point that the rollers or chains will not interfere with the action of the body springs of the carriage, and the rollers, if in practice it is found desirable, may be placed upon the rear axle, or their location may be changed as may be demanded by the style of body to be placed upon the running gear.

The spring 19, is sufficiently strong when the axle is in its true horizontal position, or is straight, as it is termed, to maintain the axle in that position without any exertion being required, or any attention being paid to the lever on the part of the person manipulating the carriage.

If it is desired to guide the carriage in the direction of the right, the right-hand end of the lever is pressed, and the forward axle will be carried diagonally beneath the side bars in response to the movement of the lever; and in the same manner, if it is desired to guide the carriage in the direction of the left, the left-hand end of the lever is pressed in direction of the handle bar and pressure is exerted upon the lever until the carriage has made the desired turn. When released the spring will restore the lever to its normal horizontal position and the axle will likewise be brought to its normal position, which is parallel with the rear axle.

By using an angular lever and a flat bow spring, the lever need not project far from the handle bar, as when the lever is in its normal position the faces at each side of the lever opposed to the handle bar will occupy a position at a decided angle to the bar, and by reason of the inclined inner faces of the lever it may be pressed until the said faces come practically to an engagement with the handle bar.

This device is exceedingly simple, it is economic, and may be attached to any carriage. Furthermore, it is capable of being expeditiously and readily manipulated, and it is not necessary that the lever should be gripped except when the carriage is to be directed to the right or to the left; otherwise, the carriage may be manipulated the same as a carriage of the ordinary construction.

In connection with the chains or cables turn buckles 23 or equivalent tension devices are employed, as it is important that the chains or cables should always be tight. By means of the tension devices any slack occurring in the cable or chain may be conveniently and expeditiously taken up, and the forward axle may be readily adjusted to the exact parallel of the rear one.

Having thus described my invention, I claim as new and desire to secure by Letters Patent—

1. In the running gear of a child's carriage, the combination, with the side bars and the handle bar, of a forward axle pivotally connected with the side bars, a lever pivotally connected with the handle bar, a spring exerting pressure upon the lever and normally maintaining it in a horizontal position, and chains or cables connecting the ends of the lever with the forward axle, the attachment to the axle being made at each side of its center, substantially as shown and described.

2. In a child's carriage, the combination, with the handle bar of the running gear and the forward axle pivotally connected with the running gear, of a lever pivotally connected at its center with the handle bar, the outer face of the lever being beveled from its center outward in opposite directions, a spring bearing against the beveled surfaces of the lever, and a chain or cable connection between the ends of the lever and the forward axle, as and for the purpose set forth.

3. In a child's carriage, the combination, with the handle bar of the running gear and a forward axle pivotally connected with the running gear, of a spring-pressed lever pivotally connected at its center with the handle bar, the surface of the lever facing the handle bar being beveled outward in opposite directions from the center, a chain or cable connection between the ends of the lever and the forward axle, the connection being made with the latter at each side of its center, and guide devices over which the chains or cables pass and located between the lever and the forward pivoted axle, and tension devices carried by the chains, as and for the purpose set forth.

GEORGE B. BEST.

Witnesses:
HENRY C. JACKSON,
RUFUS A. GORHAM.